United States Patent

[11] 3,623,762

[72] Inventor James D. Fagan
 631 Deerwood St., Columbia, S.C. 29205
[21] Appl. No. 45,395
[22] Filed June 11, 1970
[45] Patented Nov. 30, 1971

[54] PENTHOUSE CAR CAMPER
 6 Claims, 13 Drawing Figs.
[52] U.S. Cl. ................................................ 296/23,
 135/1 A
[51] Int. Cl. ...................................................... B60p 3/34
[50] Field of Search ............................................. 296/23.2,
 23; 135/1 A, 3 A, 4 A, 5 A

[56] References Cited
 UNITED STATES PATENTS
2,670,747 3/1954 Schmiege .................... 135/1 A FOREIGN PATENTS
998,255 9/1951 France ..................... 296/23.2

Primary Examiner—Philip Goodman
Attorney—Townsend M. Belser, Jr.

ABSTRACT: A collapsible tent camper detachably mounted on the roof of an automobile comprising a main platform, foldable mattress platforms along opposing sides of the main platform, and a flexible tent cover overlying all of said platforms in their open position and supported thereover by a superstructure and collapsible frame of novel design. Integrally mounted on the superstructure is a collapsible table which in its collapsed position cooperates with the folded side platforms to form a storage compartment for transporting camping equipment. Provision is also made for a permanently installed ladder pivotally connected to the rear of the main camper platform.

PATENTED NOV 30 1971

INVENTOR
James D. Fagan

BY Townsend M. Belser, Jr.
ATTORNEY

INVENTOR
James D. Fagan

BY Townsend M. Belser, Jr.
ATTORNEY

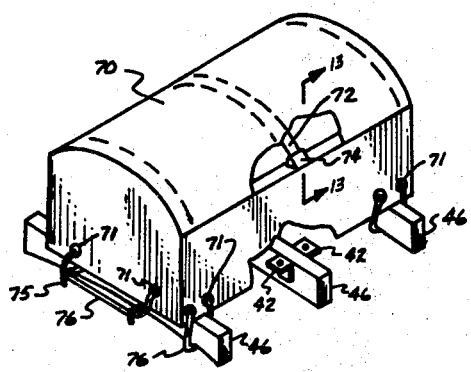
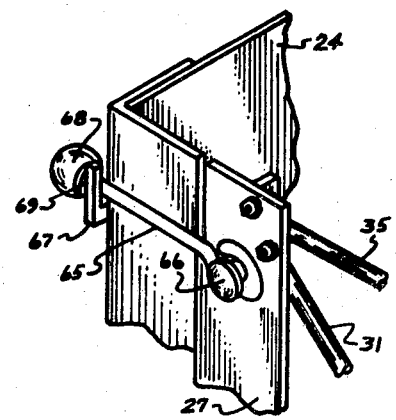
FIG. 8          FIG. 9
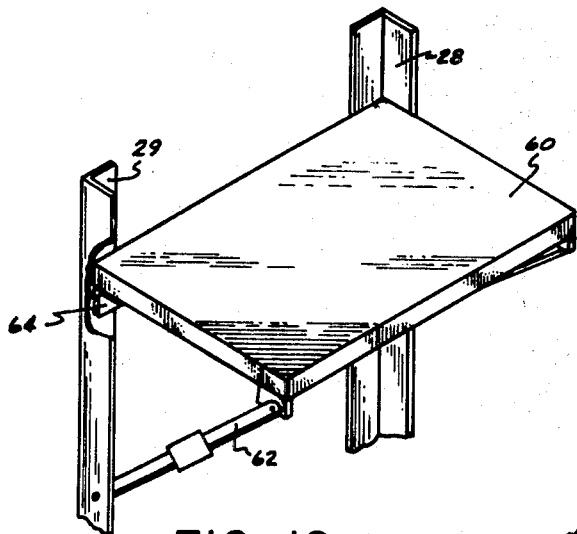
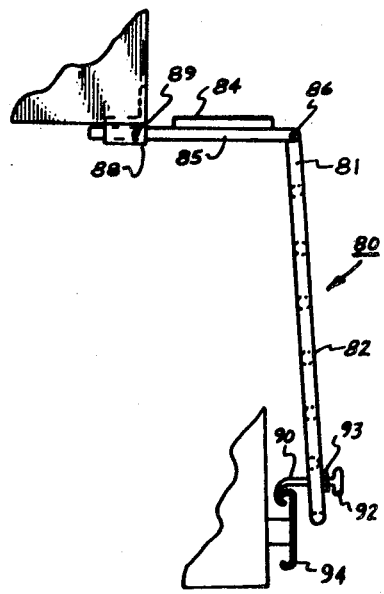
FIG. 10
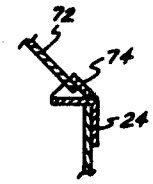
FIG. 13
FIG. 11
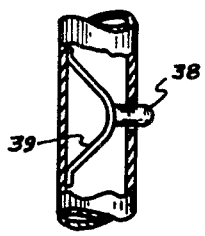
FIG. 12
INVENTOR.
James D. Fagan
BY Townsend M. Belser, jr.
ATTORNEY

PENTHOUSE CAR CAMPER

BACKGROUND OF INVENTION

This invention is related to foldable tent campers mounted for transportation on a vehicular body and adapted to be opened into a tent structure and to be collapsed into a relatively compact traveling enclosure. More specifically, the invention is directed to a penthouse camper adapted to be mounted on the roof of an automobile, such as a station wagon, and when in its collapsed position to define a storage compartment of substantial size for transporting mattresses, stoves, appliances and other camping equipment on the roof of the automobile. When opened, the camper folds out into a large tent enclosure having a spacious central living space in which persons of average height may stand erect and sufficient floor space to accommodate mattresses for sleeping four adult persons at night. Mattresses may be left on the side platforms during the day to serve as seats for persons using the central living space.

One of the purposes of this invention is to provide a collapsible and mobile tent unit that may be taken on camping trips or cross-country automobile trips to provide a spacious living area when camping and while traveling a compact luggage or storage compartment for the camping accessories necessary to comfortably furnish the living area, thereby conserving available luggage space within the automobile itself. That purpose is accomplished through a novel camper unit adapted to be detachably mounted on the roof of a standard automobile and having a flexible tent cover enclosing and supported by a superstructure and framework that is collapsible and foldable with the cover to form a package significantly smaller than the erected tent enclosure for easy transportation from one place to another.

Placement of the camper on the roof of an automobile eliminates the need for hauling a separate camper or trailer unit behind the automobile, with the attendant inconvenience and danger of towing a trailer and the necessity of complying with state laws and other regulations pertaining to hauling a trailer over the highways. In addition, most camping expeditions require a large amount of additional equipment which usually takes most of the available luggage space of the automobile, such that often suitcases, clothing, and other personal items must be left behind for lack of a storage area in which to carry the same.

Although there are a number of collapsible tent structures found in the prior art, most of those structures are independent of an vehicular mounting and must be collapsed and transported as separate units, taking up available luggage or passenger space in the automobile. Separate trailer or camper units are difficult and dangerous to two and have serious disadvantages as previously indicated. There are a few collapsible structures found in the prior art which can be mounted on the roof of an automobile. However, those structures are directed only to sleeping units with little head room and no aboveground living space. In addition, the prior art camper and tent devices are difficult and complex to assemble and most are cumbersome to store, pack, unpack, set up, take down, or carry or transport from one place to another. Furthermore, prior art devices do not have component parts that are interchangeable. Instead, the parts of such devices are of different sizes and are often disassociated from one another such that they are lost or damaged in transit and cannot be readily replaced. All of the foregoing disadvantages are eliminated through the use of applicant's invention.

SUMMARY OF INVENTION

With the foregoing background and prior art in mind, a principal object of the present invention is to provide a collapsible camper unit which can be detachably mounted on the roof of an automobile, such as a station wagon. The camper unit has a superstructure adapted to be supported on and above the automobile roof and a tent framework mounted thereon supporting and collapsible with the tent cover. The superstructure and its accessories, together with the tent framework, collapse to form a storage compartment for travel. The superstructure and framework of the camper are of simple and inexpensive construction and arranged in such a manner as to be easy for one man to set it up and to collapse it. The camper unit has a central, horizontally disposed main platform providing a living area during the day and a sleeping area at night for at least two people. A foldable mattress platform is mounted along each of the two long sides of the main platform to provide two additional sleeping areas at night and sitting areas during the daytime. The collapsible tent framework and flexible tent cover are located over and completely enclose the spacious living and sleeping areas so defined.

Another object of the present invention is to provide a compact and covered storage compartment for transporting both said camper unit and the camping equipment and appliances for furnishing the same mounted on an automobile roof and fully protected from the wind generated by the moving automobile and from inclement weather. It is therefore one object of my invention to meet the need which has long existed for a large, spacious camper easily mounted on and constituting an integral part of an automobile, and for additional storage space for the camping equipment necessary to furnish a camper and provide the conveniences for living comfortably therein.

A further object of the present invention is to provide a storage compartment defined by the camper's closed superstructure having adequate storage space to contain the collapsed tent cover and framework and still carry the camper mattresses, stove and refrigerator and other camping equipment and accessories.

Another object of the present invention is to provide a camper with a rigid tent framework of such large size in its open position as to accommodate a person of average height standing erect and provide a spacious living area for changing clothes and relaxing in inclement weather.

A further object of the present invention is to provide a collapsible table integrally connected to the camper superstructure and arranged in its collapsed position to form the forward end of a storage compartment and to support the tent cover and connected framework above and in spaced relation to the main platform so as to provide storage space thereunder for transporting camping equipment and facilities as aforesaid.

A further object of the present invention is to provide a camper unit with a detachable ladder that can be permanently mounted at the rear of the main camper platform to provide ready access to the top of the automobile for unloading the storage compartment formed by the closed camper and for thereafter opening and assembling the camper living enclosure. The ladder also provides ready access for entering and leaving the assembled camper. For purposes of access to and from the rear compartment of the automobile means is provided to pivot the ladder up out of the way.

Another object of the present invention is to interconnect the tent framework and tent cover in a novel manner to facilitate raising and lowering the tent closure uniformly and in one operation to eliminate the need for separately assembling and disassembling each component part of the framework and tent structure. The interconnected structure of the present invention also prevents loss of or damage to parts during transit, as often occurs where tent parts are disconnected and separated upon disassembly.

In addition to the numerous advantages apparent from the foregoing discussion, the present invention has the further advantages of simplicity, ruggedness, durability, and ease and economy of construction and manufacture. The apparatus of the present invention can be constructed from standard parts all of which are commercially available and can be put together and assembled with relatively few machine tools. The exact nature of the invention as well as other objects and advantages thereof will be readily apparent from the annexed drawings and the following specific description of the preferred embodiment of the invention.

DESCRIPTION OF DRAWINGS

For a better understanding of the present invention, reference is made to the accompanying drawings in which:

FIG. 8 is a perspective view of the collapsed camper with its tarpaulin in place and has fragmentary sections showing the support stops and arched slats supporting the tarpaulin, and the roof blocks to main platform brackets.

FIG. 9 is an enlarged detail of construction of the pivoted platform clamp securing the side platforms in their raised or collapsed position adjacent to the vertical corner posts of the camper superstructure.

FIG. 10 is an enlarged detail of construction showing the collapsible table mounted on the two corner posts at the forward end of the camper superstructure.

FIG. 11 is an enlarged detail of construction of the permanent ladder detachably mounted at the rear of the main camper platform.

FIG. 12 is an enlarged fragmentary sectional view of the construction details of the detent buttons in the camper framework.

FIG. 13 is an enlarged vertical section taken along line 13—13 of FIG. 8.

DETAILED DESCRIPTION OF PREFERRED EMBODIMENT

Figure 1:
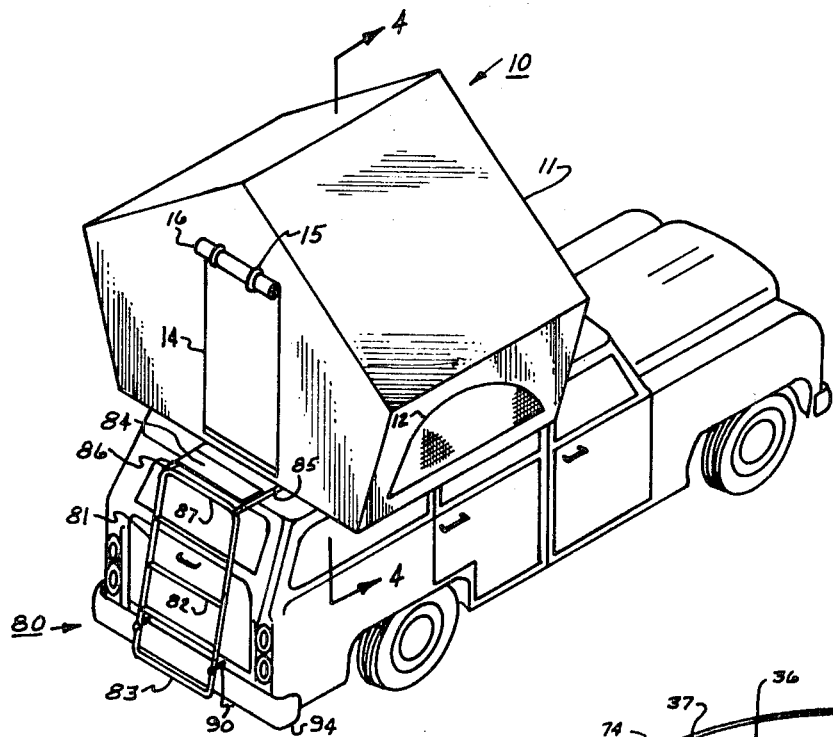
FIG. 1 is a perspective view of the camper unit in its assembled and open position ready for occupancy and use.
Figure 2:
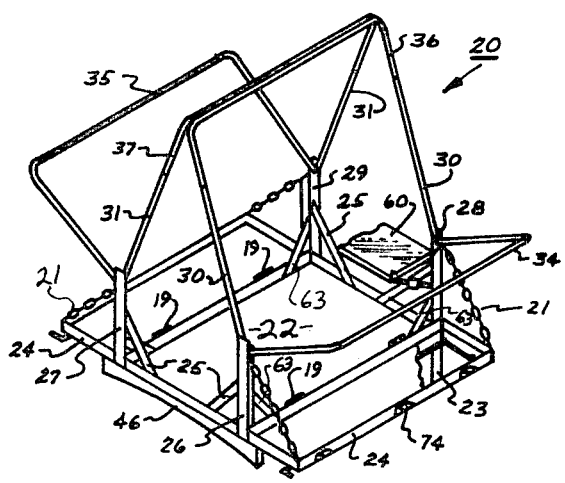
FIG. 2 is a perspective view of the superstructure and framework of the camper with the tent cover removed.
Figure 4:
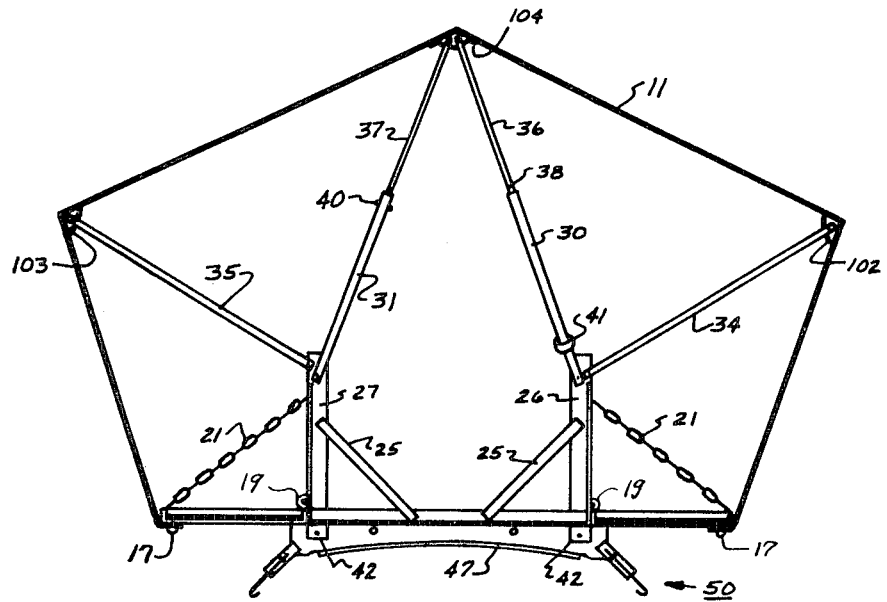
FIG. 4 is a rear elevation of the invention taken along line 4—4 of FIG. 1 and showing the tent superstructure and framework supporting the tent cover in its open position.

Referring now to the drawings and particularly to FIGS. 1, 2 and 4, there is illustrated one form of the penthouse car camper made according to the present invention. FIG. 1 shows the cover or canvas 11 of the tent enclosure 10 in its open condition ready for occupancy. The tent cover 11 is comprised of a flexible waterproof material, such as treated nylon or cotton canvas, and is stretched over the framework shown in FIG. 1. The tent enclosure 10 may include suitable side windows 12 and an access door 14. A suitable drop canvas or zippered door cover 16 may be used to close the door opening and a pair of door straps 15 are located over and adjacent to the top of the door opening to secure the door cover in a rolled open position as shown in FIG. 1. The windows 12 may also have covers zippered around the inside periphery thereof so that the windows may be closed in inclement or cold weather. In the preferred embodiment, the tent cover 11 includes depending side panels on all four sides of the enclosure and the bottom edges of those panels are detachably anchored to the underside of the tent superstructure by means of a series of snaps 17 as illustrated in FIG. 4. The snaps are spaced approximately 6 to 8 inches apart under and near the outer periphery of the superstructure platforms with the male element of the snaps mounted on the superstructure and the female element fastened to the tent cover.

As shown best in FIGS. 2 and 4, the camper unit may comprise a tent frame, generally designated 20, mounted on a superstructure including a main platform 22, a pair of hinged side platforms 24—24, and four vertically projecting corner posts 26, 27, 28, and 29. In the specific embodiment disclosed, the frames of each of the aforesaid platforms and the four vertical corner posts are each made from 2-inch by 2-inch angle iron stock. The platform frames consist of four angle iron sections secured together into a rectangular structure with the sides of the angles extending upwardly and inwardly to support plywood flooring as best illustrated by the cutaway portion of the side platform floor shown in FIG. 2. To strengthen the side platforms 24—24, struts 23 of flat metal stock are utilized as additional bracing on the underside of the frames. Struts 25 of the same material are used as additional bracing to rigidly anchor the vertically standing corner posts as shown in FIG. 2. Struts 25 are relatively large to prevent lateral displacement of the corner posts by the substantial bending movements generated by the load-bearing side platforms. Smaller struts 63 provide the longitudinal bracing of the corner posts required when the camper is collapsed and transported on the automobile roof. The angle iron frames of the platforms, the corner posts of the main platform, and associated bracing struts all preferably utilize a welded construction.

Figure 3:
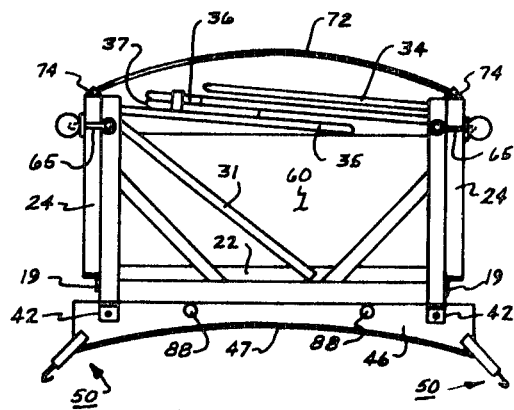
FIG. 3 is a rear elevation of the camper superstructure and framework in the collapsed position defining a storage compartment with free space below the folded framework.

With reference to FIG. 4 of the drawings, the side platforms 24—24, when in their open position, are supported in substantially the same horizontal plane as the main platform 22 by means of link chains 21, of which one end is attached to the top portion of a corner post and the other end is attached to the outside edge of a platform near the forward or rear end thereof. As there are four corner posts, one at each corner of the main platform, and one chain extends laterally from each post to the nearest point of attachment on the adjacent side platform, there are a total of four supporting chains, one attached to each end of the two side platforms are illustrated in FIG. 2. In order to provide a pivotal connection between the main platform 22 and the two side platforms 24—24 along each side thereof, butt hinges 19 are mounted between the angle irons at the inner edge of the side platforms and the outer edges of the main platform as shown in FIGS. 2 and 3. The location of the hinges is such that the pivot point thereof is at the top leading edge of the abutting angle irons of the main and auxiliary platforms and the wings of the hinge extend down between the edges of the platforms and abut when the side platforms are in their open position.

Mounted on the corner posts of the camper superstructure is the tubular camper frame 20 which may include a first pair of tubular prop members 30—30, one connected to each of the support posts 26 and 28, and a second pair of tubular prop members 31—31, one connected to each of the support posts 27 and 29. Telescopically mounted within the pair of prop members 30—30 is a U-shaped tent brace 36, one leg of which is fitted within each of the members 30. When the frame is in its opened or extended position, a corresponding U-shaped tent brace 37 is telescopically fitted within the pair of tubular prop members 31—31. To provide the extreme outer wings of the tent framework in its open position is a U-shaped tent brace 34 pivotally connected directly to posts 26 and 28 and a U-shaped tent brace 35 pivotally connected directly to posts 27 and 29 as shown in FIGS. 2 and 4 of the drawings.

U-shaped braces 34 and 35 have legs of equal length, the free ends of which are pivotally connected to the corner posts as indicated. U-shaped tent braces 36 and 37 also have legs of equal length which may be either extended or collapsed by the telescoping action of those legs within tubular prop members 30—30 and 31—31 as will be more fully explained hereinafter. U-shaped tent brace 36 is held in its extended position by means of spring biased detent buttons 38 in each end thereof. Corresponding tent brace 37 is held in its extended position by means of stops 40 secured within tubular prop members 31—31. The relative positions of the detents 38 and the stops 40 when the frame is in its open position can be seen more clearly in FIGS. 4 and 5. The structure of the brace detent, which includes a button 38 biased by a leaf spring 39 within each leg of the tubular brace 36, is shown in FIG. 12 of the drawings. When brace 36 is in its fully extended position, detent buttons 38 pop out of and rest upon the upper end of props 30. Encircling each of the props 30 is a leather or rubber retaining strap 41 which comes into use when the tent frame is collapsed as will be explained later.

As best seen in FIGS. 3 and 8, the main platform 22 is mounted and supported on the roof of an automobile by means of three roof blocks 46 having clamps 50 bolted at each end thereof to fasten the blocks to the drain channel around the automobile roof. A roof block is located below each end of the main platform and set in so that the ends of the main platform overhang the roof blocks. The third roof block is located approximately in the middle of the longitudinal length of the main platform as shown in FIGS. 2 and 8. The roof blocks 46 are rigidly secured to the underside of the angle iron members running down each side of the main platform by means of brackets 42 which consist of short pieces of angle iron stock, one leg of which is welded to the underside of the angle iron member and the other leg of which is bolted to the block. As shown in FIG. 8 a separate mounting bracket 42 is located on opposite sides of the roof block such that a single bolt passing through the block secures the depending legs of both brackets.

On the underside of each roof block 46 is a curved bearing surface which conforms to the curvature of the car roof. This surface may terminate a short distance from each end of the block as shown in FIG. 4 to provide a projecting end portion for mounting clamps 50. A strip of rubber or foam padding 47 may be laminated to the curved bearing surface of each support block to provide a padded resting surface for the blocks which will not scratch or otherwise damage the roof of the automobile. In the preferred embodiment this padding strip is comprised of polyurethane foam. Where the roof of the automobile or station wagon already has luggage strips secured thereon and running longitudinally to the automobile body, padding on the underside of the blocks is not required as the luggage strips will protect the automobile roof. Luggage strips also help to distribute the weight of the camper over the roof area and thereby provide a good supporting surface upon which to amount the camper.

Figure 7:
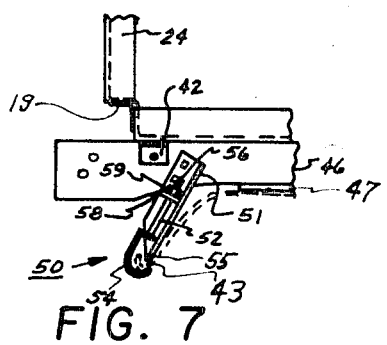
FIG. 7 is an enlarged detail of construction showing the detachable clamp structure for anchoring the camper roof blocks to the roof drain of an automobile

The construction details of the roof clamps 50 are shown in FIG. 7. The roof clamp is comprised of an anchor bracket 51 on which a clamping bolt 52 is mounted by means of guide plate 58 through which it passes. The guide plate provides a bearing surface for the nut 59 threaded on the inner end 56 of the clamping bolt. At the outer end of the clamping bolt is a hooked jaw portion 54 which engages the roof drain of the automobile. The outer end of the bracket 51 is tapered to a relatively narrow edge 55 adapted to fit within the drain channel 43. The clamp bracket 51 is bolted to roof block 46 and may be located on the projecting end portion and as shown in FIG. 4 or moved inward for smaller cars as illustrated in FIG. 7. Upon tightening the nut 59, the bolt 52 is drawn up clamping the roof drain tightly between the jaw 54 and the bracket edge 55 resting in the drain. In order to protect the drain from damage, a rubber bumper or pad may be glued to bracket edge 55. When the roof clamps are screwed down tightly on the roof drains, the bearing surface of the roof blocks 46 rests firmly upon the automobile roof.

With reference to FIGS. 2 and 10 of the drawings, inside and at the forward end of the camper opposite the door there is a folding table 60 mounted on corner posts 28 and 29 in such a manner as to extend horizontally therebetween when in the open position. In its open position, the table 60 is supported on each side by a collapsible brace 62 of well-known construction. The forward end of the table is secured to each of the vertical corner pots by means of butt hinges 64 located under the table top as shown in FIG. 10. When brace 62 is collapsed, the table folds down into a vertical position whereby the lower edge of each end of the table top is adjacent to the posts 28 and 29, respectively.

Rigidly secured to the underside of the angle iron members at each end of the side platforms 24—24 and L-shaped latch seats 67 as best seen in FIG. 9 of the drawings. When the side platforms are in their raised or closed position, the latch seats 67 may be engaged by the platform latches 65 as shown in FIG. 3. The shank has a threaded outer end of which is placed a washer 69 and a threaded latch ball 68 so that the latch ball may be screwed down against the underside of the latch seat to firmly secure the auxiliary platforms 24—24 in their raised position. To avoid projections which could snag and tear the tent cover 11 or the travel tarpaulin 70, the length of the latch shank is such that its threaded outer end does not extend completely through the latch ball. In order to permit the latch shank to slide down within the groove formed by the latch seat when in use and to be moved out of the way when not in use, the inner end of the latch shank is pivotally secured to a stud 66 mounted on the upper rear face of the rear corner posts and on the upper forward face of the forward corner posts of the camper superstructure. FIG. 9 shows the pivotal connection between the corner post 27 and the latch shank 65, and also the connections between that corner post and the U-shaped outer brace 35 and the straight tubular prop member 31. The same pivotal connections are utilized on the remaining three corner posts.

At the rear of the camper unit an access ladder is provided as shown in FIGS. 1 and 11. The ladder is designed to remain in position on the automobile while traveling and has a pivot joint at 86 to allow the depending section of the ladder to swing up into a horizontal position so that entrance may be gained to the rear compartments of the automobile. The permanent mounting of the ladder facilitates opening and erection of the camper by providing access to the closed camper and a secondary platform from which the camper may be assembled by a single person.

The top portion of the ladder consists of a platform 84 mounted at each side on a pair of horizontally extending tubular members 85 which are telescopically supported within a pair of sleeves 88 rigidly secured to the underside of the main camper platform at the point where it overhangs the rear roof block. A detent button, similar to that shown in FIG. 12, is mounted within each support member 85 so as to pop out into a corresponding detent hole in sleeves 88 and lock the support members 85 in position at the rear of the camper main platform. A pair of depending side members 81 are pivotally connected to the platform supports 85 by means of a bolted pivot joint 86. Ladder rungs 82 are connected between and spaced along side members 81 in the usual fashion and a bottom crossmember 83 and a top crossmember 87 integrally join the side members together at the bottom and top thereof, respectively. Passing through the lower portion of each side member 81 is a bumper clamp 90 adopted to rigidly fasten the lower end of the ladder to the automobile bumper 94. A hooked inner end of the bumper clamp fits over the top of the bumper and engages the inside thereof when tightened down. The clamping action is adjusted by means of a wingnut 92 and a washer 93 bearing against the outside rear of the ladder side supports 81.

The collapsed or closed position in which the camper is placed when it is to be transported from one place to another is illustrated in FIG. 3 of the drawings. In that position the table 60 at the front of the camper superstructure is collapsed so that the table top extends in a vertical plane to provide a windbreak for the interior area over the main platform. To maximize the surface available both for use as a table and as a forward windbreak panel, the width of the table top is approximately equal to the projecting length of the corner posts from the main platform floor to the point at which the frame components are pivotally attached. As shown in FIG. 3, side platforms 24—24 are pivoted into their raised position around hinges 19 and held in that position by means of platform latches 65. In that position, side platforms 24—24 provide a windbreak extending along each side of the camper superstructure.

By reason of the width and thickness of the table top 60, the U-shaped tent braces 34, 35, 36 and 37, and props 30 which remain connected to brace 36, do not fold all the way to the floor of the main platform when in their collapsed position, but are held substantially in a horizontal position resting on the upper edge of the collapsed table as illustrated in FIG. 3. However, as straight prop members 31 are disconnected from the legs of U-shaped brace 37, those two props are not supported by the table edge and swing inward until their upper freed ends rest upon the main platform floor. The thus freed ends of the U-shaped brace 37 are pivoted toward brace 36 and secured by means of the retaining strap 41 in a position adjacent to the legs of brace 36 telescoped within props 30.

As evident from the foregoing description, the collapsed camper structure defines a storage compartment bounded by the table 60, the side platforms 24—24, and the folded tent frame 20. Into this relatively large storage space may be placed mattresses to be used as camper beds, stoves and other appliances, and numerous items of camping equipment to comfortably furnish the a assembled camper. Those items are all in addition to the usual amount of luggage and clothing required for an extended trip. After the camper has been placed in its collapsed position and the storage space packed with camping equipment, the camper is covered by a traveling tarpaulin 70 as illustrated in FIG. 8 of the drawings. To increase the storage space and provide an improved aerodynamic shape, the tarpaulin is supported vertically in a relatively flat curve by means of arched slats 72 which are held in place in a bowed position by means of slat stops 74 mounted on the upper (outer) edge of the side platforms. In the preferred embodiment, slat stops 74 are comprised of a small U-shaped member sized so that the base of the U slightly exceeds the width of the slats 72. Opposing legs of the U are cut at a 45° angle so that the member abuts the outer edge of the side platform to form a three-sided pocket as illustrated in FIG. 13 of the drawings. The abutting edges of stops 74 are preferably welded to the outer surface of the angle iron along the outer edge of the side platform. A series of three pairs of opposing stops and three arched slats are used in the preferred embodiment of the invention. The travel tarpaulin 70, which is roughly rectangular in shape, is secured in its traveling position by means of eyelets 71 along the lower edges of the depending sides thereof. Tie-downs 76 pass through the eyelets and are secured either by passing around and under the roof blocks 46 or under hooks 75 which may be mounted on the roof blocks.

When the tarpaulin is thus tied down securely, it is well sealed and protects the camper from inclement weather. It retains its shape against the wind forces by reason of the backing provided by table 60, side platforms 24–24, and slats 72. In addition, the flexible wooden slats bowed into an arch under the top portion of the tarpaulin provide an upwardly curved and transversely extending crown so that water quickly runs off and the tarpaulin is supported in a good aerodynamic shape. In the preferred embodiment, the length of the flexible slats are chosen such that the crown is approximately 4 inches high at its peak. Although preferably of wood, the slats may be made from any strong, flexible material, such as plastic or metal.

Upon arriving at the desired location for setting up the camper, the tie-downs are released and the traveling tarpaulin removed from the camper superstructure, along with the arched slats 72. The camper is then ready for the unfolding and opening operation which commences with the various components in the positions shown in FIG. 3 of the drawings. The platform latches 65 are first unscrewed and pivoted so as to free the outer edges of side platforms 24–24 from the upper ends of posts 26, 27, 28 and 29. This allows the side platforms to swing laterally and down into the horizontal plane of the main platform and to be supported in that position by chains 21. In this open position, the inner bottom edge of each side platform rests upon the projecting outer ends of roof blocks 46 and the side platforms thereby receive additional vertical support. By reason of the great lateral and vertical support provided by the chains and corner posts, as anchored by struts 25, and the additional support points at the ends of the roof block and between the abutting edges of the main and side platforms, each side platform is capable of upholding at least 300 pounds without any auxiliary underpinning (such as pillars or posts from the automobile or the ground).

Figure 5:
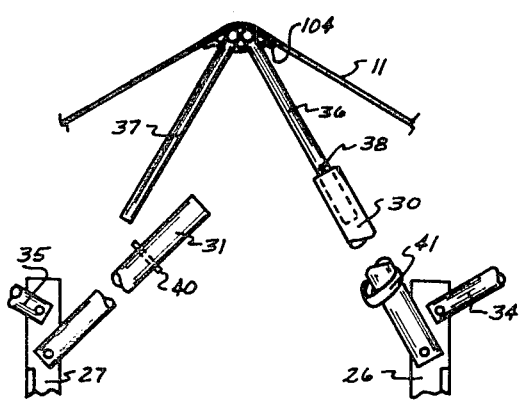
FIG. 5 is a fragmentary view showing the tent framework in a partially disassembled position.
Figure 6:
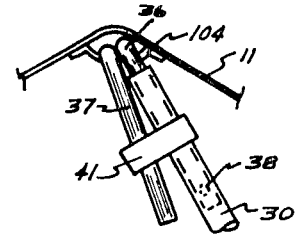
FIG. 6 is a fragmentary view showing the manner of securing a portion of the tent framework for travel.

After the side platforms are in their horizontal position, tent braces 34 and 35 are pivoted laterally from their nest positions to the positions beyond and over the side platforms as shown in FIG. 4. From FIG. 4, it can be seen that the base of the U-shaped braces 34 and 35 are secured within cloth channels 102 and 103 stitched to the inside surface of the tent cover 11. The base portions of U-shaped braces 36 and 37 are pivotally held together in a similar stitched channel 104. Thus, when braces 34 and 35 are in their extended positions, the associated movement of the tent cover 11 pulls braces 36 and 37 into the raised position illustrated in FIG. 6. At this point brace 36 is pushed out of its collapsed position within telescopic prop 30 until detent buttons 38 on each leg pop out to rest on the upper end of props 30 as shown in FIG. 5. As brace 36 is moved into its extended position, straps 41 should be held in place so that the legs of brace 37 are freed from those straps. The props 31 are then picked up from their rest position on the floor of the main platform and held in an upright position while the free ends of the legs of the brace 37 are placed telescopically within the upper ends of the props to rest against stops 40. With the detent buttons 38 holding brace 36 in its extended position and brace 37 in its extended position against stops 40, the tent framework is in its fully open and extended position. The tent cover is then stretched and secured in its open position by fastening its lower edges to the series of snaps 17 on the underside of the side and main platforms. The raised tent enclosure may then be entered by means of access ladder 80 and the table 60 at the front end thereof raised into its horizontal or open position.

The camper is now ready for use and occupancy. Mattresses sized to fit within the angle irons of the side platforms are placed in position on each of those platforms. During the day those mattresses may be used as seats while the central living space on the main platform is left free for changing clothes and the usual day activities of a living area. The table at the forward end of the camper provides an extremely useful surface for cooking, eating, playing cards, and setting up games, and as a storage or supporting area for luggage and clothing. When nighttime arrives two additional mattresses or a single double mattress may be placed in the central area of the main platform for sleeping. Thus a total of four sleeping areas for adults are available with the large floor space of the present invention. At night the table 60 may be placed in either its collapsed or raised position depending upon the amount of head room desired. If left open, reading lamps, heaters and other utilities may be placed on the table during the evening for use throughout the night. When breaking camp the following morning, the foregoing procedure for raising the penthouse camper is merely reversed, with the ends of brace 37 being pulled free from props 31 and then pivoted and secured in their collapsed position by straps 41. As the U-shaped braces are always retained in channels within the tent cover, the cover is readily folded as those braces are collapsed into their "nest" or collapsed position. In addition, because the prop members and tent braces are permanently attached to the corner posts and the braces are retained within canvas channels, loss of or damage to those components is prevented.

With reference to the construction materials employed in the preferred embodiment of the invention, the main platform 22 is 4 feet wide by 7 feet long and the side platforms are 2 feet wide by 7 feet long. Three-quarter inch marine plywood is used as the flooring in each of the platforms. The platform frames and the corner posts are made of 2-inch by 2-inch by 3/16-inch angle iron stock cut to the specified lengths. The corner posts extend vertically upward 26 inches from the bottom of the main platform. U-shaped braces 34, 35, 36 and 37 are made from ½-inch tubular aluminum stock. Prop members 30 and 31 are made from ¾-inch tubular aluminum stock and are 34 inches in length. When braces 36 and 37 are extended to their open length, the distance from the post connections of the props 30 and 31 to the base of the U-shaped braces in channel 104 is 62 inches, providing head room at the center of the tent enclosure of approximately 6½ feet. Spacious areas over the auxiliary platforms are also provided by U-shaped braces 34 and 35 having side legs approximately 45 inches in length. In their open and extended position, the base portions of braces 34 and 35, in channels 102 and 103 respectively, form tent eaves which project horizontally approximately 1 foot beyond the outer side edges of the side platforms at a vertical distance of approximately 4 feet above those platforms.

In the preferred embodiment, the roof support blocks consist of wooden two-by-fours which extend transversely under the main platform and are 4 feet 6 inches in length. That length provides a 3-inch projecting support surface beyond each side of the main platform. As previously explained, that surface is utilized as a seat area for the bottom inner edge of the side platforms when in their open position. Referring to the ladder 80 illustrated in FIG. 11 of the drawings, the ladder is made from 1-inch steel tubing. Side supports 85 are 22 inches in overall length and support a ¾-inch plywood platform measuring 14 inches in width by 18 inches in length. Both the side supports 81 and the landing supports 85 are spaced approximately 18 inches apart. Anchor sleeves 88 are comprised of steel tubing 1¼ inches in diameter and 3 inches in length. The length of the side supports 81 depend on the particular automobile used. For my automobile I use ladder side supports 41 inches in length as measured from crossbar 83 to the hinged pivot point 86.

With the novel design and construction shown, it was found that a spacious penthouse camper could be easily and adequately supported on the roof of a standard station wagon automobile. The camper unit according to the present invention can be constructed relatively easily, is compact in its closed position, and is weatherproof both in its collapsed and in its open positions. The structure disclosed is durable, strong, and spacious when in its open and extended position. It is also apparent that the camper framework and superstructure may be both extended and collapsed by a simple operation carried out by a single person.

Although but a single embodiment of the present invention has been described, other embodiments and variations will occur to those skilled in the art. It is possible, of course, to use various features of the specific embodiment described, either separately or in various combinations, and such uses are within the contemplation of the present invention. Furthermore, many structural changes are possible and are intended to be within the scope of this disclosure. It is also to be understood that the foregoing drawings and specification merely illustrate and describe a preferred embodiment of the invention and that other embodiments are contemplated within the scope of the appended claims.

I claim:

1. A camper unit adapted to be detachably mounted on the roof of an automobile comprising:
    1. a superstructure comprised of:
        a. a main platform,
        b. support means adapted to support said main platform upon the roof of an automobile in substantially a horizontal plane and to be detachably fastened to said roof,
        c. a first pair of upwardly projecting corner posts rigidly mounted at one side of said main platform and a second pair of said corner posts rigidly mounted at the opposing side of said platform, one post of each of said pairs being near the forward end and the other near the rear end of said main platform,
        d. a pair of side platforms, one of said platforms being pivotally mounted at each side of said main platform,
        e. means connecting each of said side platforms to the pair of corner posts at the same side of said main platform to support said side platforms in an open position in substantially the same horizontal plane as the main platform, and
        f. means for securing each of said side platforms in a closed position in substantially a vertical plane adjacent to said interconnected pair of corner posts, said side platforms in their closed position forming opposing sidewalls of a storage compartment for camping equipment;
    2. a tent cover of flexible sheet material foldable between an open position forming a tent enclosure over said main and side platforms in their open position and a closed position over said main platform for travel, said cover having depending sidewalls adapted to be secured around the outer periphery of said opened platforms; and
    3. a collapsible tent frame pivotally mounted on the upwardly projecting ends of the corner posts of said superstructure for supporting said tent cover in its open position and foldable with said cover between its open position and its closed position overlying said main platform, said frame in its open position and said corner posts adapted to support said cover in such spaced relation above said main and side platforms as to allow a person of average height to stand erect on the main platform and fully sit up on the side platforms, all within the tent enclosure.

2. A camper unit as claimed in claim 1 wherein a table is pivotally mounted on the two corner posts near the forward end of said main platform and collapsible between an open position in substantially a horizontal plane and a closed position in substantially a vertical plane adjacent to said forward corner posts, said table in its closed position forming the forward wall of a storage compartment for camping equipment.

3. A camper unit as claimed in claim 2 wherein said side platforms include means at the outer side edge thereof for upwardly supporting a travel tarpaulin of waterproof flexible sheet material over the storage compartment formed by said main and side platforms and said table in their closed positions.

4. A camper unit as claimed in claim 1 wherein a ladder means is detachably mounted at the rear end of said main platform and adapted to interconnect said platform and the rear bumper of said automobile and to remain in said interconnected position during automobile travel, said ladder means including an upper ladder platform adapted to be detachably secured to said main camper platform and a depending ladder component pivotally connected to said ladder platform and adapted to be detachably secured to said automobile bumper and upon detachment to swing into a substantially horizontal position allowing access to the rear compartments of said automobile.

5. A camper unit as claimed in claim 1 wherein said collapsible tent frame includes an essentially U-shaped swing brace pivotally attached to each pair of corner posts and adapted to swing laterally to an open position for outwardly supporting the near side of said tent cover, an elongated tubular prop pivotally attached to each of said corner posts, a first essentially U-shaped center brace extendibly mounted at the outer end of the pair of said props attached to one of said pairs of corner posts, and a second essentially U-shaped center brace adapted to be detachably mounted at the outer end of said other pair of props, said center braces being pivotally fastened together along their base and adapted to extend the effective height of said props and support said tent cover approximately over the center of said main platform when said frame is in its open position.

6. A camper unit as claimed in claim 5 wherein in their open position said tent cover and said swing braces are adapted to extend laterally to form eaves over and beyond the outer edges of said side platforms.

* * * * *